July 21, 1964 R. H. WENTORF, JR 3,141,847
N-TYPE ELECTRICALLY CONDUCTING CUBIC BORON
NITRIDE AND PROCESS FOR PREPARING SAME
Filed Aug. 31, 1960
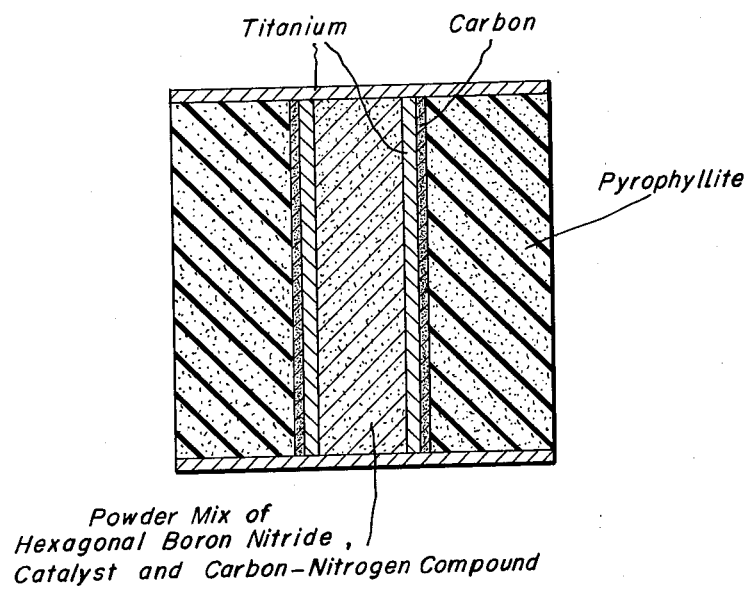
*Inventor:*
*Robert H. Wentorf, Jr.,*
by Joseph T. Cohen
*His Attorney.*

3,141,847
N-TYPE ELECTRICALLY CONDUCTING CUBIC BORON NITRIDE AND PROCESS FOR PREPARING SAME
Robert H. Wentorf, Jr., Schenectady, N.Y., assignor to General Electric Company, a corporation of New York
Filed Aug. 31, 1960, Ser. No. 53,225
12 Claims. (Cl. 252—62.3)

This invention is concerned with electrically conducting cubic boron nitride and methods for making the same. More particularly, the invention relates to a cubic boron nitride of a strongly electrically conducting nature having enhanced n-type semiconducting properties, the said n-type cubic boron nitride being prepared by heating at elevated temperatures and pressures hexagonal boron nitride or a source of hexagonal boron nitride in the presence of a compound having a carbon attached directly to a nitrogen. In the preparation of the above-described n-type cubic boron nitride, the usual catalysts for conversion of the starting boron nitride to cubic boron nitride state are employed.

In my U.S. Patent 2,947,617, issued August 2, 1960, and assigned to the same assignee as the present invention, there is described and claimed a hard, heat-resistant, material comprising cubic boron nitride. This cubic boron nitride, which has an atomic configuration corresponding to the atomic configuration of zinc blende (ZnS), can be prepared by converting the common form of boron nitride, for instance, hexagonal boron nitride, to the cubic form under the action of heat and pressure in the presence of at least one catalyst selected from the class consisting of alkali metals, alkaline earth metals, tin, lead, antimony, and nitrides of the foregoing metals, the pressures and temperatures being selected so as to be in the range in which the catalyst is operative to convert ordinary boron nitride to cubic boron nitride. This cubic boron nitride is different from the usual hexagonal boron nitride, which is a relatively soft powdery material, by having a cubic crystalline configuration analogous to the configuration of zinc blende, and hardness substantially equal to the hardness of diamond.

In general, the reaction whereby the usual boron nitride is converted to the cubic boron nitride is carried out in the cubic boron nitride stable range at a temperature of at least about 1200° C. and preferably between 1200° C. to 2200° C., and a pressure above about 40,000 atmospheres, for instance, about 45,000 to 110,000 atmospheres or more. A preferred range of reaction conditions is within the temperature range of about 1500–2100° C. at a pressure of about 50,000–65,000 atmospheres. More particular directions for carrying out the conversion of the usual boron nitride to the cubic boron nitride form (such as catalyst, nitride source, catalyst source, apparatus, etc.) are found in my aforesaid patent.

When one forms the cubic boron nitride from the usual boron nitride, one finds that the cubic boron nitride has relatively low conductivity, i.e., it more often has a resistivity of from about $1 \times 10^7$ to greater than $1 \times 10^8$ ohm-centimeters when measured at around room temperature, i.e., about 25–27° C. It should be recognized that because of the extremely high temperatures and pressures used to make the cubic boron nitride, these figures may be subject to slight variation, depending not only upon the purity of materials used, but also on the conditions which exist in the chamber in which the hexagonal boron nitride is being converted to cubic boron nitride.

Improvements in conductivity of the cubic boron nitride have been accomplished by incorporating a small amount of beryllium with the usual boron nitride and the catalysts for conversion of the latter to the cubic boron nitride form. Thus, in my copending application Serial No. 2,978, filed January 18, 1960, and assigned to the same assignee as the present invention, there is disclosed a means for obtaining an electrically conducting cubic boron nitride whose conductivity is much greater than ordinarily obtained due to the fact that there are incorporated amounts of from 0.01 to as high as 40 percent, by weight, or more of an activator material, beryllium, based on the weight of the starting boron nitride. The above patent application also points out that in addition to using beryllium itself, one can also employ as activator materials, compounds of beryllium which under the conditions of the reaction at the elevated temperatures and pressures are converted to the metallic beryllium state. Included among such beryllium compounds may be mentioned beryllium halides, beryllium carbonate, beryllium nitrate, beryllium oxide, beryllium stearate, beryllium nitride, beryllium sulfide, etc. By varying the weight of the beryllium, I have been able to obtain cubic boron nitride crystals having specific electrical resistances at least as low as $1 \times 10^4$ ohm-centimeters (at room temperature) as contrasted to the usual $1 \times 10^8$ ohm-centimeters or higher specific resistance for unmodified cubic boron nitride.

The use of beryllium or compounds of beryllium decomposable to the metallic beryllium state results in the obtaining of p-type semiconductor material. The obtaining of strongly p-type semiconductor properties is particularly noticeable when the amount of beryllium employed with the hexagonal boron nitride is in a high weight proportion with the hexagonal boron nitride. Thus, as shown in Examples 5 and 6 of my aforesaid application Serial No. 2,978, when one employs on a weight basis, 1 part beryllium with from 3 to 16 parts hexagonal boron nitride, one obtains not only a highly conducting cubic boron nitride of a specific resistance within the range of from 0.04 to 1 megohm-centimeter, but in addition one also finds that the cubic boron nitride thus obtained has strong p-type semiconducting properties when measured, for example, in the manner described in the book "Introduction to Semiconductors," by W. Crawford Dunlap, published by John Wiley & Sons, Inc., New York, New York (1957), particularly pages 178–195.

It is, therefore, an object of this invention to provide cubic boron nitride having increased electrical conductivity, and more reproducible methods for making such material.

Another object of the invention is to provide a cubic boron nitride showing increased conductivity at elevated temperatures, for instance, at temperatures of from about 300–480° C. as contrasted to the usual cubic boron nitride.

A still further object of the invention is to provide a semiconducting cubic boron nitride exhibiting enhanced n-type semiconducting characteristics.

Other objects of the invention will become more apparent from the discussion which follows.

All of the foregoing objectives are obtained by incorporating in the starting materials comprising the usual boron nitride, for instance, hexagonal boron nitride, and catalysts for conversion of the latter to the cubic boron nitride form, varying amounts of a compound containing carbon attached directly to nitrogen, any of the remaining valences of the nitrogen, preferably, although not necessarily, being satisfied by attachment to carbon.

The compounds having carbon attached directly to nitrogen (hereinafter referred to as the "carbon-nitrogen compound") can be either organic or inorganic in nature. The relationship of the carbon to nitrogen attachment can be in the form of a cyano radical ($-C\equiv N$) as, for instance, alkali-metal cyanides, for example, sodium cyanide, potassium cyanide, cesium cyanide, etc; organic compounds containing carbon attached directly to nitrogen, for example, diazines, triazines, diazoles, triazoles, pyrazoles, pyrimidines, imadazolines, etc.

Among the organic compounds which may be employed are, for instance, acetonitrile, butyronitrile, acrylonitrile, dicyandiamide, triazines having the formula (1)
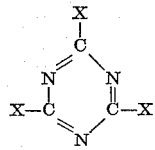

where X is a member selected from the class consisting of halogens (e.g., chlorine, bromine, fluorine, etc.), amino (—NH$_2$) groups as well as N-substituted amino groups (e.g., amino groups substituted with organic radicals of the scope that X above may be other than halogen); organic radicals, for instance, alkyl (e.g., methyl, ethyl, propyl, isopropyl, butyl, etc.), aryl (e.g., phenyl, naphthyl, biphenyl, etc.), aralkyl (e.g., benzyl, phenylethyl, etc.), alkaryl (e.g., tolyl, xylyl, ethylphenyl, etc.), etc. radicals. Among such compounds may be mentioned melamine itself, diphenylmethylmelamine, triphenyl melamine, tri-(p-chlorophenyl) melamine; halogenated melamines, e.g., trichloromelamine, tribromomelamine, etc. The groups represented by X may be the same or different. Furthermore, in addition to the symmetrical triazines recited above, one can also employ triazines in which instead of the nitrogens being in the 1,3,5 positions, they can be asymmetrical, i.e., in the 1,2,4 positions or vicinal, i.e., in the 1,2,3 positions, the remaining substitutions of X on the carbon atoms being the same as that recited for the symmetrical triazines above.

Another group of organic compounds containing carbon attached directly to nitrogen are triazole compounds having the general formula (2)
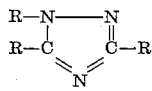

where R has the meaning given above for X and in addition may also be hydrogen. Again the nitrogens may be in varying positions, e.g., the 1,2,3-, 1,2,4-, 1,3,4-, and 1,3,5-positions. Included among such compounds may be mentioned triazole (also known as pyrrodiazole), 1,2,3-benzoisotriazole, diphenyltriazole (each phenyl group being on a ring carbon atom), etc.

Other compounds containing carbon attached directly to nitrogen are, for instance, pyrazoles having the formula (3)
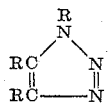

where R has the meaning above, an example of which is pyrazole itself; pyrazine (1,4-diazine) having the formula (4)
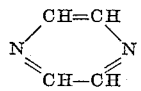

dimethyl pyrazine, pyridizine; pyrrole having the formula (5)
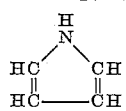

1-phenyltriazolone, triazsulfole having the formula (6)
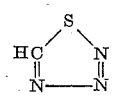

quinazoline, other diazines (e.g., pyridizine and pyrimidine), pyridine, picoline, quinoline, etc.

Another class of compounds which can be used as activators in making the conducting cubic boron nitride are the imidazolines, for example, those having the general formula (7)
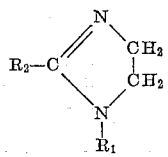

where R$_1$ is a member selected from the class consisting of alkyl or alkenyl radicals of from 1–5 carbon atoms and R$_2$ is an organic group of at least 2 to 12 carbon atoms, for example, alkyl, alkenyl, etc. Thus, R$_1$ may be the same or other alkyl radicals as recited for R above, and as examples of alkenyl radicals may be mentioned vinyl, allyl, methallyl, crotyl, etc. R$_2$ may be, for instance, butyl, amyl, decyl, tridecyl, nonadecyl, and the alkenyl radicals recited for R$_1$. Specific examples of such compounds may be mentioned, for instance, 1-isopropyl-2-undecylimidazoline, 1-methyl-2-hendecylimidazoline, 1-allyl-2-dodecylimidazoline, etc. Compounds of this type are more particularly described in U.S. Patents 2,404,300 and 2,940,848.

Preferably the organic carbon-nitrogen compound is a cyclic compound containing at least two nitrogen atoms in the ring. If non-cyclic compounds are used they tend to cyclize at the elevated temperatures and pressures. Substitution on the carbon or nitrogen can be varied widely, for instance, as specified by the values for R and X previously shown. It is highly desirable that in choosing the carbon-nitrogen compound, the compound be oxygen free and that the source of oxygen in the compound be maintained at a minimum and preferably be absent for the reason that the presence of oxygen during the reaction either in the form of atmospheric oxygen or oxygen derived from radicals attached to the carbon-nitrogen compound tends to reduce the yield of the cubic boron nitride and in some instances may even suppress the formation of cubic boron nitride. Thus, the presence of such radicals as the nitro (—NO$_2$) radical, the carboxy (—COOH) radical, the keto

radical, the aldehyde

radical, etc., are deleterious in many ways to the optimum attainment of yields of cubic boron nitride and cubic boron nitride of increased conductivity as well as enhanced n-type semiconducting properties.

In general, the carbon-nitrogen compound is one which has the grouping

where advantageously, although not essentially, the remaining valences are attached to carbon either to another carbon as per the formula

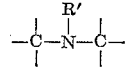

or the remaining valences are satisfied by the same carbon as in the form of a cyano group (—C≡N). Where the nitrogen is attached to two carbon atoms as in the formula

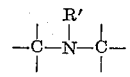

R′ can be hydrogen or any organic radical, as, for instance, the many examples of which have been given above for R, as well as such other organic radicals. The carbon (or carbons) to which the nitrogen atom is attached can have its valences (other than those satisfied by attachment to the nitrogen) satisfied by various organic radicals such as those mentioned for R and R', either in the form of chain (either straight or branched) organic groups or by cyclic organic radicals; or the carbon-nitrogen compound may be in the form of a cyclic derivative in which the carbon and the nitrogen constitute part of the ring structure, many examples of which have been given above. Alternatively, the nitrogen may be attached directly or indirectly to a ring structure as exemplified by such compounds, for instance, aniline, diaminobenzene, benzylamine, etc. Preferably, I employ in the practice of my invention carbon-nitrogen compounds in which the nitrogen is part of a ring structure with the carbon atom (or carbon atoms) to which the nitrogen is attached. In some instances, where more than one nitrogen atom is in the ring structure, it is often an advantage to use those compounds in which there are no immediately adjacent nitrogen atoms. It should be understood that the term "carbon-nitrogen compound" is intended to include not only compounds of the specific formulas recited previously, but also compounds which satisfy the general descriptions identifying the carbon-nitrogen compounds by reference to the various radicals and forms which the carbon-nitrogen portion of the compound may take.

By means of the incorporation of the carbon-nitrogen compound, it is possible to obtain cubic boron nitride having exceptionally low conductivities, particularly at elevated temperatures on the order of about 420–480° C. Even at about 25–27° C., the cubic boron nitride made in the presence of the compound containing the carbon-nitrogen linkage exhibits resistivities of from 0.5 to $1 \times 10^6$ ohm-centimeters. The use of the carbon-nitrogen compound enables one to reproduce more consistently cubic boron nitride of these high conductivities (or low resistivities). When cubic boron nitride is prepared in the absence of the carbon-nitrogen compound, the resistivity is usually high and the values for resistivity fluctuate quite widely without being subject to any control as to the resistivity values.

One additional advantage that the use of the carbon-nitrogen compound has is the fact that it reproducibly induces an enhanced n-type semiconductive propertiy in the cubic boron nitride. By using these carbon-nitrogen compounds, it is possible to obtain strongly n-type materials, i.e., materials showing higher thermoelectric powers and hence larger energy gaps for conduction, than is possible in cubic boron nitride obtained in the absence of the carbon-nitrogen compound. Thus, I have been able to obtain n-type cubic boron nitride by means of my invention having thermoelectric powers within the range of from about —100 to —200 microvolts/° C.

The amount of the carbon-nitrogen compound used may vary widely and there is not limit to the amount which could be used. Generally, the degree of conductivity and the degree of n-type semiconducting characteristics increase with the concentration of the carbon-nitrogen compound. Above a certain point, no discernible advantage in properties is realized with the larger amounts of the carbon-nitrogen compound. If too much of the carbon-nitrogen compound is used, it will be at the expense of the starting boron nitride compound used to make the cubic boron nitride. Generally, I may employ from about 1 to about 40 percent or more, by weight, of the carbon-nitrogen compound based on the weight of the starting boron nitride (or the boron nitride calculated as being derived from source materials designed to give the starting hexagonal boron nitride). A preferred range which has been found to be especially satisfactory comprises from about 3 to 15 percent, by weight, of the carbon-nitrogen compound based on the weight of the hexagonal boron nitride.

In making the cubic boron nitride having electrically conducting properties herein described, it is only essential that one make a homogeneous mixture of hexagonal boron nitride, the specific catalyst employed, and the carbon-nitrogen compound, and thereafter subjecting the mixture to elevated temperatures and pressures to obtain the electrically conducting cubic boron nitride. Alternatively, one can start with cubic boron nitride, mix it with a carbon-nitrogen compound and either with or without catalyst used for the formation of cubic boron nitride, and press the mixture at elevated temperatures and pressures at which the initial cubic boron nitride forms to convert the product to the cubic boron nitride form having the desirable electrical conductivity hereinbefore recited. The amount of carbon-nitrogen compound may vary from 10 to 1000 parts, by weight, or more of the latter per part of the cubic boron nitride.

Apparatus suitable for carrying out the high temperature high pressure reaction required to form electrically conducting cubic boron nitride is found described in U.S. Patent 2,941,248 of Howard Tracy Hall, issued June 21, 1960, and assigned to the same assignee as the present invention. Similar apparatus is described in my above-mentioned patent in which the catalyst used for making cubic boron nitride may be employed in the form of coarse or fine powders or as a tube within which the hexagonal boron nitride and the carbon-nitrogen compound introduced, the tube itself acting as a catalyst for the conversion of the hexagonal boron nitride to the cubic boron nitride form. Titanium, tantalum or carbon may also be used to contain the ingredients.

The amount of catalyst used may vary widely. Preferably, one employs on a weight basis about 0.1 part to 1 part of catalyst per part of the hexagonal boron nitride, although it is obvious that one can employ larger or smaller amounts of catalyst or hexagonal boron nitride (which is also intended to include source materials capable of yielding boron nitride) without departing from the scope of the invention. The larger amounts of catalyst will reduce the amount of cubic boron nitride formed, and ordinarily this excessive amount of catalyst is not essential. Generally, it is only necessary to place the mixture of the catalyst, hexagonal boron nitride and the carbon-nitrogen compound in a press in a suitable reaction vessel such as a tantalum or graphite tube or even in a tube made from the catalyst metal (in which case no additional catalyst is needed) and subject the assembly to a pressure within the range described above for about 3–30 minutes to form the electrically conducting cubic boron nitride.

In order that those skilled in the art may better understand how the present invention may be practiced, the following examples are given by way of illustration and not by way of limitation. All parts are by weight.

In these examples, the high pressure high temperature apparatus used is that described in my aforesaid U.S. Patent and in Hall Patent 2,941,248. In general, the manner of carrying out the high pressure high temperature reaction was as follows. Hexagonal boron nitride, the carbon-nitrogen compound, and catalyst, in a homogeneously mixed form, were placed in a titanium tube, open at both ends and whose dimensions are most specifically recited in the following examples. The titanium tube was encased in a close-fitting spectroscopic arc (high purity) carbon tube, and this assembly was placed in another snugly fitting tube comprising a compressible ceramic, specifically pyrophyllite, described in my aforementioned patent. End caps or disk closures of titanium metal (about 0.01 to 0.02 inch thick) were placed at each end of the titanium tube so that the end caps covered the end surfaces of the titanium tube, the carbon tube and the pyrophyllite tube, as is more particularly described in the attached drawing in which the single cross-sectional figure shows the relationship of the three nesting tubes. This assembly was then placed inside a suitable high pressure high temperature apparatus. After carrying out the high temperature high pressure reaction, the temperature was reduced first, then the pressure and the cubic boron nitride was separated by dissolving the matrix in which cubic boron nitride was formed in hydrochloric acid or aqua regia. This resulted in most cases in a mixture of cubic boron nitride with some unreacted hexagonal boron nitride. Cubic boron nitride was separated from the hexagonal boron nitride by hand or by using a filtration technique in which the mixture was added to bromoform in which the hexagonal boron nitride would float and in which the cubic boron nitride sinks. In all these tests resistance heating was employed to bring the reaction to the desired temperature.

The pressure conditions were determined in the manner described in my aforesaid Patent 2,947,617 using as standards the electrical resistance transition pressures for certain metals, namely, bismuth, thallium, cesium, and barium, as reported by P. W. Bridgman in "Proceedings of the American Academy of Arts and Sciences," volume 81, pages 165–251 (1952).

The formation of cubic boron nitride was established by X-ray crystallography, refractive index, density, crystal habit, and hardness tests. The conductivity (or specific resistance) was measured by a probe technique with a volt-ohm-milliammeter. The semiconductive properties were established by thermoelectric power measurements and measurements of resistance at different temperatures.

In the following examples, the tests for electrical resistance versus temperature and thermoelectric power all were carried out by effecting electrical contact (known as the "Probe Technique") to the cubic boron nitride crystals by heavy silver wire (0.05 inch diameter). The wires and the crystals were fitted in the bore of a Pyrex glass capillary tube approximately 0.05 inch in diameter. Appropriate precautions were taken to eliminate leakage currents, to minimize any sources of error. The resistance meter (which was a volt-ohm-milliammeter) used in these tests was capable of measuring resistivities of about $10^7$ ohm-centimeters for a 1 millimeter crystal, and of detecting resistivities up to about $5 \times 10^7$ ohm-centimeters. With specific reference to determining the thermoelectric power (which was taken between silver electrodes), a sensitive galvanometer was used to estimate the current in the circuit and the total circuit resistance was measured with a volt-ohm-milliammeter. The average crystal temperature (during measurement for thermoelectric power) was about 200° C. and the average temperature difference was about 10° C. The average size of the cubic boron nitride crystals tested was within the range of from about 0.1 to 0.8 millimeter in diameter.

EXAMPLE 1

In this example, 14 parts hexagonal boron nitride, 7 parts lithium nitride ($Li_3N$), and 1 part melamine, each in powder form, were intimately mixed together and placed in a titanium capsule (or tube) about 0.4 inch in diameter and 0.93 inch long. The titanium tube and its contents were then placed in a snugly fitting carbon tube (about 0.44 inch in diameter) which in turn was placed in a pyrophyllite tube as described previously. An end cap or disk of titanium about 0.02 inch thick was placed across each end of the assembly as shown in the accompanying drawing. The total assembly was pressed for 40 minutes at 1800° C. at about 59,000 atmospheres. At the end of this time the cubic boron nitride thus formed was isolated and was identified by its crystalline cubic habit, refractive index, and hardness as being cubic boron nitride, and conformed in every respect (except for its electrical resistivity) to the crystal structure and cubic boron nitride recited in my aforesaid patent. The following Table I shows the resistivity of some of the crystals of cubic boron nitride obtained by this means as a function of the temperature.

Table I

| Temperature, ° C.: | Resistivity, ohm-centimeters |
|---|---|
| 30 | $2.5 \times 10^6$ |
| 200 | $1.3 \times 10^4$ |
| 320 | $1.3 \times 10^4$ |
| 460 | $2 \times 10^3$ |

The crystals obtained in this manner had good semiconducting characteristics and were strongly n-type. This was established by measurements which showed the cubic boron nitride had a thermoelectric power of —200 microvolts/° C. Some crystals of cubic boron nitride made similarly as above with lithium nitride as a catalyst (10 parts hexagonal boron nitride and 3 parts $Li_3N$) but without melamine were found to have electrical resistivities as shown in Table II Table II

| Temperature, ° C.: | Resistivity, ohm-centimeters |
|---|---|
| 30 | $8 \times 10^6$ |
| 460 | $6 \times 10^3$ | and to have a thermoelectric power of —68 microvolts/° C. When the cubic boron nitride was made similarly as above but using instead magnesium nitride ($Mg_3N_2$) as a catalyst (4 parts hexagonal boron nitride and 1 part magnesium nitride) but omitting the melamine, the specific resistances of some crystals of such a cubic boron nitride, selected for their low resistivities, were as shown in Table III.

Table III

| Temperature, ° C.: | Resistivity, ohm-centimeters |
|---|---|
| 25 | $1 \times 10^7$ |
| 300 | $2.5 \times 10^5$ |
| 430 | $5 \times 10^4$ |

EXAMPLE 2

In this example employing the tube arrangement and dimensions of said tubes as defined in Example 1, a mixture of 16 parts hexagonal boron nitride, 4 parts lithium nitride, and 1 part 2-methylpyrazine was subjected similarly as was done in Example 1 to a temperature of about 1800° C. at a pressure of about 60,000 atmospheres for 15 minutes. At the end of this time the cubic boron nitride was isolated in the same manner described for Example 1 and tested for electrical resistance and degree of n-type characteristics. The following Table IV shows the electrical resistance at various temperatures for the cubic boron nitride prepared with the 2-methylpyrazine.

Table IV

| Temperature, ° C.: | Resistivity, ohm-centimeters |
|---|---|
| 30 | $1 \times 10^6$ |
| 480 | $5.5 \times 10^2$ |

The strong n-type characteristics of this material were evidenced by a thermoelectric power of about —180 microvolts/° C.

EXAMPLE 3

In this example employing the apparatus and measurements for the various tubes recited in Example 1, 16 parts hexagonal boron nitride, 4 parts lithium nitride and 1.2 parts potassium cyanide were mixed together and heated at 1800° C. at a pressure of about 60,000 atmospheres for 12 minutes. There was thus obtained a cubic boron nitride having good electrical conductivity as evidenced by the fact that it had the following resistivities as described in Table V.

Table V

| Temperature, ° C.: | Resistivity, ohm-centimeters |
|---|---|
| 30 | $9 \times 10^5$ |
| 420 | $3 \times 10^3$ |

The n-type characteristic of the material was evidenced by the fact that it showed a thermoelectric power of about −180 microvolts/° C.

EXAMPLE 4

Employing the apparatus and measurements for the various reaction tubes recited in Example 1, a mixture of 16 parts hexagonal boron nitride, 4 parts lithium nitride, and 1 part pyridine was pressed for 15 minutes at a temperature of about 1800° C. at a pressure of about 60,000 atmospheres. At the end of this time the cubic boron nitride thus formed was isolated and when tested was found to have a resistivity of about $2 \times 10^6$ ohm-centimeters at about 27° C.

EXAMPLE 5

Employing the same equipment and dimensions of reaction tubes as recited in Example 4, a mixture of 16 parts hexagonal boron nitride, 4 parts lithium nitride, and 1 part symmetrical tribromomelamine was heated for 15 minutes at about 1800° C. at a pressure of about 60,000 atmospheres. At the end of this time, the cubic boron nitride thus obtained was isolated and after testing was found to have a resistivity 27° C. of about $9 \times 10^5$ ohm-centimeters.

EXAMPLE 6

This example illustrates the effect of varying the concentration of catalyst and activator based on the charge of hexagonal boron nitride used. More particularly, employing a titanium capsule about 0.40 inch in diameter and 0.928 inch long, placed in a carbon tube about 0.44 inch in diameter and about 0.928 inch long, were charged varying amounts of hexagonal boron nitride, lithium nitride, and melamine. End caps were placed on the tube similarly as in Example 1. Each of the mixtures was pressed at approximately 1800° C. at a pressure within the range of from 60,000–70,000 atmospheres for varying lengths of time. Thereafter, the formed cubic boron nitride was isolated in each case and the specific resistance determined. The following Table VI shows the proportions of ingredients used, the time of pressing, and the resistivities in ohm-centimeters.

Table VI

| | Sample No. | | |
|---|---|---|---|
| | 1 | 2 | 3 |
| Ingredients: | | | |
| Hexagonal boron nitride | 6 | 12 | 12 |
| Lithium nitride | 2 | 3 | 3 |
| Melamine | 1 | 1 | 1 |
| Time of Pressing (Minutes) | 8 | 10 | 5 |
| Specific Resistance (Ohm-centimeters) at about 30° C | $1 \times 10^4$ | $1.5 \times 10^4$ | $2.5 \times 10^5$ |

The following example illustrates the preparation of the highly electrically conductive n-type cubic boron nitride by heating at elevated temperatures and pressures (used to make cubic boron nitride) preformed cubic boron nitride in the presence of a carbon-nitrogen compound in this example, specifically potassium cyanide and melamine.

EXAMPLE 7

About 10 crystals of cubic boron nitride of a particle diameter between 0.4 to 0.5 millimeter were homogeneously dispersed in a powder comprising in one instance, melamine and in another instance potassium cyanide in which each set of ingredients was packed into a titanium capsule about 0.125 inch in diameter and about 0.45 inch long. The titanium capsule with its contents was placed in a carbon tube similarly as was done in Example 6. End caps were placed on the tubes as was done in Example 1 and each of the tubes with its contents was pressed in the same high pressure apparatus as employed previously for 1 hour at about 85,000 atmospheres and 1800° C. After isolation of the cubic boron nitride, it was found that the cubic boron nitride heated in the presence of the melamine had increased in conductivity by a factor of 2 over the starting cubic boron nitride (prepared in the absence of a carbon-nitrogen compound) and the cubic boron nitride heated in the presence of the potassium cyanide had increased in conductivity by a factor of 3 as compared again to the untreated cubic boron nitride.

It will, of course, be apparent to those skilled in the art that in addition to using the lithium nitride catalyst above, other catalysts may be employed, many examples of which have been recited above, without departing from the scope of the invention.

The conditions may be varied as well as the concentration of the carbon-nitrogen compounds and of the catalyst materials without in any way affecting the scope of the invention herein defined and claimed. Instead of using the carbon-nitrogen compounds recited in the above examples and the proportions of carbon-nitrogen compounds, these can also be varied and other carbon-nitrogen compounds, many examples of which have been given above, may be used within the scope of the claimed invention. The above-described cubic boron nitride compositions having the enhanced n-type semiconductor characteristics are useful as semiconductors and semiconducting devices such as transistors, rectifiers, thermometers, etc. Additionally, they can also be used as electroluminescent devices for light sources or as high energy particle counters. The fact that the cubic boron nitride is electrically active recommends its use as a high temperature catalyst for oxidation and recombination reactions.

What I claim as new and desire to secure by Letters Patent of the United States is:

1. N-type electrically conducting cubic boron nitride having a zinc-blende cubic structure prepared by heating at elevated temperatures in excess of 1200° C. and pressures in excess of 40,000 atmospheres a mixture comprising hexagonal boron nitride and a catalyst for the conversion thereof of cubic boron nitride in the presence of from 1 to 40 percent, by weight, based on the weight of the hexagonal boron nitride, of a carbon-nitrogen compound different from the aforesaid catalyst and which is substantially free of oxygen and contains carbon attached directly to nitrogen.

2. The process for making n-type electrically conducting cubic boron nitride having a zinc blende cubic structure which comprises heating at elevated temperatures in excess of 1200° C. and pressures in excess of 40,000 atmospheres, a mixture comprising hexagonal boron nitride and a catalyst for the conversion thereof to cubic boron nitride in the presence of from 1 to 40 percent, by weight, based on the weight of the hexagonal boron nitride, of a carbon-nitrogen compound different from the aforesaid catalyst and which is substantially free of oxygen and containing carbon attached directly to nitrogen.

3. The process for making n-type electrically conducting cubic boron nitride having a zinc blende cubic structure and having a low electrical resistivity of less than $1 \times 10^7$ ohm-centimeters when measured at 25° C., which comprises heating at elevated temperatures in excess of 1200° C. and pressures in excess of 40,000 atmospheres a mixture composed of hexagonal boron nitride, a catalyst for conversion of the hexagonal boron nitride to cubic boron nitride, and from 1 to 40 percent, by weight, based on the weight of the hexagonal boron nitride, of a carbon-nitrogen compound selected from the class consisting of melamine, 2-methylpyrazine, potassium cyanide, pyridine, and tribromomelamine.

4. The process for making n-type electrically conducting cubic boron nitride having a zinc blende cubic structure and having a low electrical resistivity below $1\times10^7$ ohm-centimeters when measured at 25° C., which comprises heating at elevated temperatures of at least 1200° C. and pressures of at least 40,000 atmospheres a mixture comprising hexagonal boron nitride, a catalyst for converting the hexagonal boron nitride to cubic boron nitride, and from 1 to 40 percent, by weight, based on the weight of the hexagonal boron nitride, of a triazine compound substantially free of oxygen.

5. The process for preparing n-type electrically conducting cubic boron nitride having a zinc blende cubic structure and having a low electrical resistivity of less than $1\times10^7$ ohm-centimeters when measured at 25° C., which comprises heating a mixture comprising hexagonal boron nitride, lithium nitride, and from 1 to 40 percent, by weight, based on the weight of the hexagonal boron nitride, of melamine at elevated temperatures of at least 1200° C. and pressures in excess of 40,000 atmospheres, and thereafter isolating the formed cubic boron nitride.

6. The process for preparing n-type electrically conducting cubic boron nitride having a zinc blende cubic structure and having a low electrical resistivity below $1\times10^7$ ohm-centimeters when measured at 25° C., which comprises heating a mixture comprising hexagonal boron nitride, lithium nitride, and from 1 to 40 percent, by weight, based on the weight of the hexagonal boron nitride, of 2-methylpyrazine at elevated temperatures of at least 1200° C. and pressures of at least 40,000 atmospheres, and thereafter isolating the formed cubic boron nitride.

7. The process for preparing n-type electrically conducting cubic boron nitride having a zinc blende cubic structure and having a low electrical resistivity below $1\times10^7$ ohm-centimeters when measured at 25° C., which comprises heating a mixture comprising hexagonal boron nitride, lithium nitride, and from 1 to 40 percent, by weight, based on the weight of the hexagonal boron nitride, of pyridine at elevated temperatures of at least 1200° C. and pressures of at least 40,000 atmospheres, and thereafter isolating the formed cubic boron nitride.

8. The process for preparing n-type electrically conducting cubic boron nitride having a zinc blende cubic structure and having a low electrical resistivity below $1\times10^7$ ohm-centimeters when measured at 25° C., which comprises heating a mixture comprising hexagonal boron nitride, lithium nitride, and from 1 to 40 percent, by weight, based on the weight of the hexagonal boron nitride, of potassium cyanide at elevated temperatures of at least 1200° C. and pressures of at least 40,000 atmospheres, and thereafter isolating the formed cubic boron nitride.

9. The process for preparing n-type electrically conducting cubic boron nitride having a zinc blende cubic structure and having a low electrical resistivity below $1\times10^7$ ohm-centimeters when measured at 25° C., which comprises heating a mixture comprising hexagonal boron nitride, lithium nitride, and from 1 to 40 percent, by weight, based on the weight of the hexagonal boron nitride, of tribromomelamine at elevated temperatures of at least 1200° C. and pressures of at least 40,000 atmospheres, and thereafter isolating the formed cubic boron nitride.

10. The process for preparing n-type electrically conducting cubic boron nitride having a zinc blende cubic structure and having a low electrical resistivity less than $1\times10^7$ ohm-centimeters when measured at 25° C., which comprises heating a mixture comprising hexagonal boron nitride, lithium nitride, and from 1 to 40 percent, by weight, based on the weight of the hexagonal boron nitride, of melamine at a temperature in excess of 1200° C. and at a pressure above 45,000 atmospheres.

11. The process for preparing n-type electrically conducting cubic boron nitride having a zinc blende cubic structure which comprises heating cubic boron nitride at elevated temperatures of at least 1200° C. and pressures of at least 40,000 atmospheres in the presence of from 1 to 40 percent, by weight, based on the weight of the aforesaid boron nitride, of melamine.

12. The process for preparing n-type electrically conducting cubic boron nitride having a zinc blende cubic structure which comprises heating cubic boron nitride at elevated temperatures of at least 1200° C. and pressures of at least 40,000 atmospheres in the presence of from 1 to 40 percent, by weight, based on the weight of the aforesaid boron nitride, of potassium cyanide.

References Cited in the file of this patent

UNITED STATES PATENTS

| | | |
|---|---|---|
| 2,922,699 | Lauzau | Jan. 26, 1960 |
| 2,947,617 | Wentorf | Aug. 2, 1960 |

FOREIGN PATENTS

| | | |
|---|---|---|
| 970,869 | Germany | Nov. 6, 1958 |
| 1,208,937 | France | Sept. 14, 1959 |

OTHER REFERENCES

Mellor: "A Comprehensive Treatise on Inorganic and Theoretical Chemistry," Longmans, Green and Co., N.Y., 1928, vol. VII, pages 108–109.